United States Patent [19]

Renick et al.

[11] Patent Number: 4,527,405
[45] Date of Patent: Jul. 9, 1985

[54] SECURITY LOCK FOR CASSETTE RECORDERS AND CASSETTE PLAYERS OR THEFT DISCOURAGEMENT DEVICE FOR CASSETTE RECORDERS AND CASSETTE PLAYERS

[76] Inventors: William A. Renick, 1025 Sumac Dr., Sunnyvale, Calif. 94086; Donald W. Sutter, 6392 Farm Hill Way, San Jose, Calif. 95120

[21] Appl. No.: 488,385

[22] Filed: Apr. 25, 1983

[51] Int. Cl.³ .............................................. E05B 73/00
[52] U.S. Cl. .............................................. 70/14; 70/58
[58] Field of Search .................. 70/14, 57, 58, 61, 85, 70/86, 431, 432, 433; 206/1.5, 387; 312/333

[56] References Cited

U.S. PATENT DOCUMENTS 3,130,571  4/1964  Neumann ................................ 70/58
4,131,001  12/1978  Gotto ..................................... 70/14

*Primary Examiner*—Robert L. Wolfe
*Attorney, Agent, or Firm*—Claude A. S. Hamrick

[57] ABSTRACT

A key-driven mechanism 14 that locks into the cassette-insert opening 12 of an audio/video cassette recorder or cassette player 10. After insertion into the cassette recorder or player, rotation of a key 16 extends cams from within the device to prevent removal of the device. The device includes a lock 20 mechanism with removable key, a helical turn screw and screw sleeve by which key rotation is translated into lineal movement, a cam-actuator affixed to the screw and which is moved by the turning of the key and cams 24 that are coupled to the actuator and which extend from the device or retract as a result of key rotation.

3 Claims, 8 Drawing Figures

SECURITY LOCK FOR CASSETTE RECORDERS AND CASSETTE PLAYERS OR THEFT DISCOURAGEMENT DEVICE FOR CASSETTE RECORDERS AND CASSETTE PLAYERS

BACKGROUND OF THE INVENTION

Field of the Invention

As crime mounts and police are overburdened, prevention of theft and recovery of stolen cassette recorders and cassette players has become increasingly difficult. In recent years, the quality and value of these items has increased, making them tempting targets for theft. Other attempts at security improvements by owners have been associated with strengthening the mounting of the item (as in automobile radios) to make removal more difficult. These security devices did not prevent theft, but did deter theft in that removing the item from its mounting became more difficult. Several versions of the above-described security devices are available to the public. However, they are not used widely because:

a. the devices are expensive (relative to the value of the item to be protected);

b. complex installation is required; and c. when theft occurs, the mounting and surrounding items are often damaged.

SUMMARY OF THE PRESENT INVENTION

It is therefore an object of the present invention to provide a low-cost security device that does not require complex installation.

A further object of the present invention is to provide a security device that deters theft, but does not encourage damage by a determined thief.

The above-stated objects are fulfilled by a security device that prevents use of the cassette recorder or cassette player and is readily seen by a potential thief. This security device is a locking mechanism that can be partially inserted into the cassette-insert opening of a cassette recorder or player and locked into place. Thus, theft will be discouraged, not by making theft more difficult, but by increasing the labor required to profit from theft. The device contains a key-lock, such that the key can be removed from the lock when in any of several positions, cams that can be extended from or retracted into the device, and a mechanism that translates key rotation into cam movement.

The device partially inserts into the cassette-insert opening in the face plate of a cassette recorder or cassette player, then it is locked into place. Thus, it can be manufactured of any suitable material rugged enough so that if an attempt is made to pull the locked device from the opening, the face plate will be damaged, rather than the device. The body or case of the device is so constructed that it cannot easily be crushed using common hand tools, but must instead be cut or sawed to gain access to internal parts.

IN THE DRAWING

FIGS. 5, 6, 7, and 8 are front views showing the four lock positions in which the key can be removed.

DETAILED DESCRIPTION OF THE PREFERRED EMBODIMENT

Figure 1:
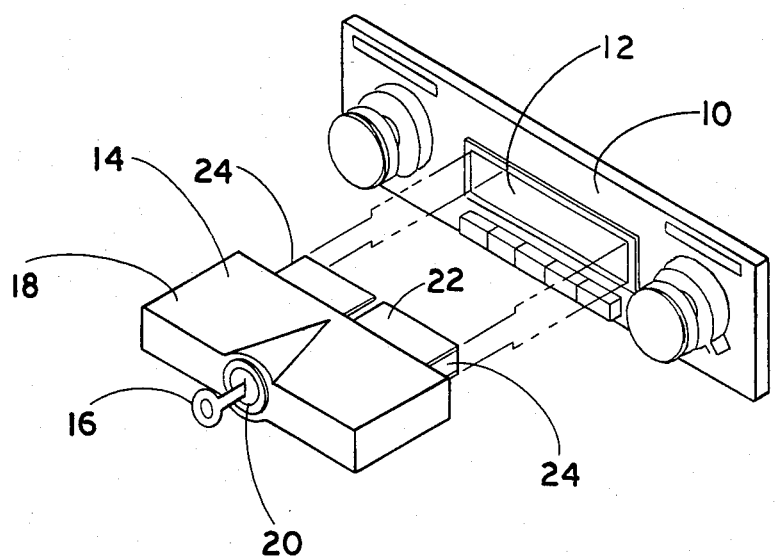
FIG. 1 is an exploded perspective view showing a locking mechanism in accordance with the present invention along with an illustration of a radio/cassette player into which it may be inserted.

Referring now to FIG. 1 of the drawing, a radio/cassette player device is illustrated at 10 having a receving opening 12 of the type into which a recorded cassette may be inserted in length-wise fashion. Shown disposed in exploded relationship thereto is a locking mechanism 14 and associated key 16 in accordance with a preferred embodiment of the present invention.

As will be more clearly and described below, the device 14 includes a main body portion 18, a lock cylinder 20, an insertable rear body portion 22 and a pair of locking cams 24. In use, the rear portion 22 of the device is inserted into the tape receiving slot 12 and the key 16 is turned sufficient to cause the cams 24 to the pivoted outwardly to engage the interior side walls of the slot 12, or the face plate surrounding the opening 12, thereby locking the device in position and preventing use of the tape player. Obviously, with the key removed, the device cannot be withdrawn from engagement with the tape player.

Figure 2:
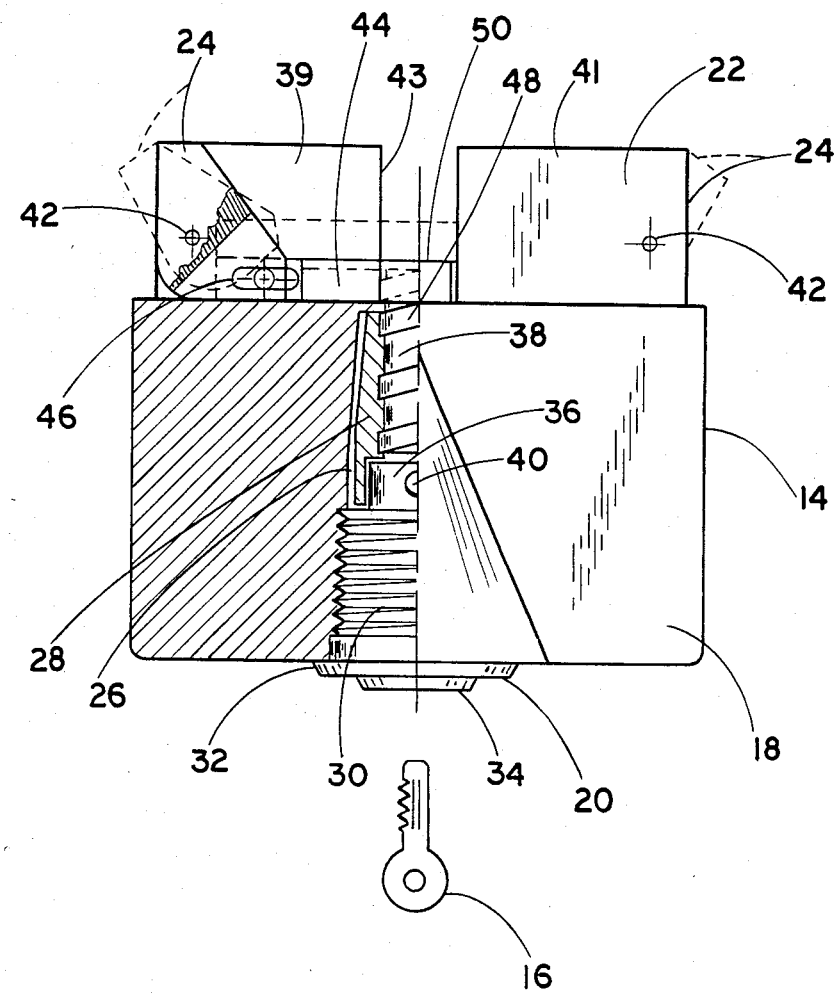
FIG. 2 is a partially sectioned plan view showing the operative parts of the device.

Referring now to FIG. 2 of the drawing, the device 14 is shown in partially sectioned configuration to reveal the internal components thereof. As illustrated, the external or main body position 18 includes a partially threaded bore 26 for receiving the lock unit 20 and a screw driving nut 28. Lock cylinder 20 is of standard configuration having an externally threaded body portion 30, an outer bezzle 32 and a key receiving rotatable lock cylinder 34. The rearmost portion of cylinder 34 is shown at 36 and turns relative body 30 when the key is turned. Nut 28 is generally cylinderical in configuration and has an internally threaded bore 38. One end thereof is adapted to fit over the end 36 of cylinder 34 and is secured thereto by a pin 40.

The interior or insert portion 22 of the device is divided into left and right side parts 39 and 41 by longitudinally extending slot 43 and both parts are transversely slit to provide a recepticle for the two cams 24, which are pinned and pivotally connected to portion 22 at 42, and a cam actuator bar 44 which is coupled to cams 24 by a slot and pin configuration as illustrated at 46. Bar 44 is attached to one end of a lead screw 48 which threads into nut 28.

Figure 3:
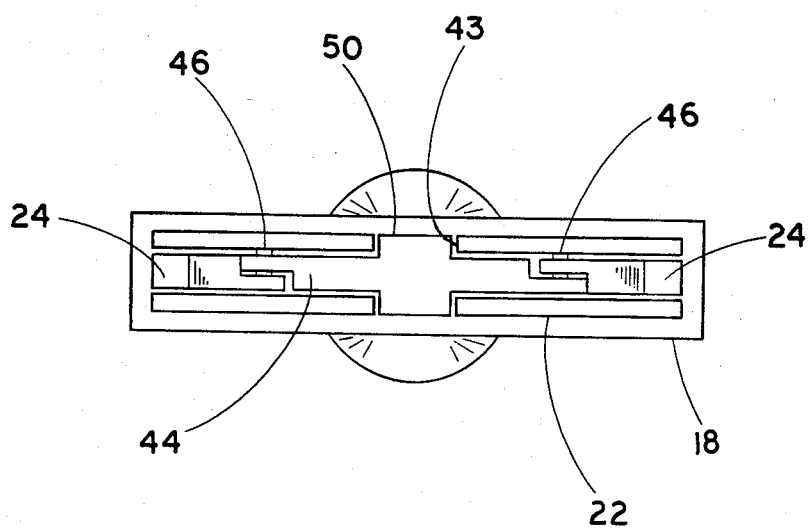
FIG. 3 is a rear end view thereof.
Figure 4:
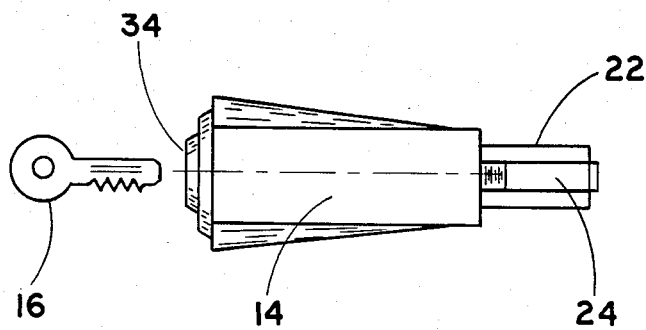
FIG. 4 is a side view thereof.
Figure 5:
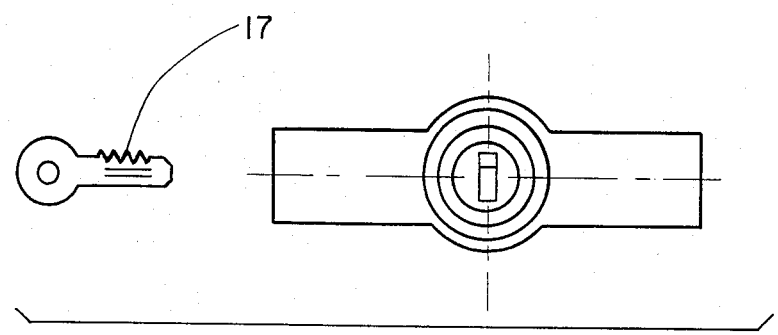
Figure 6:
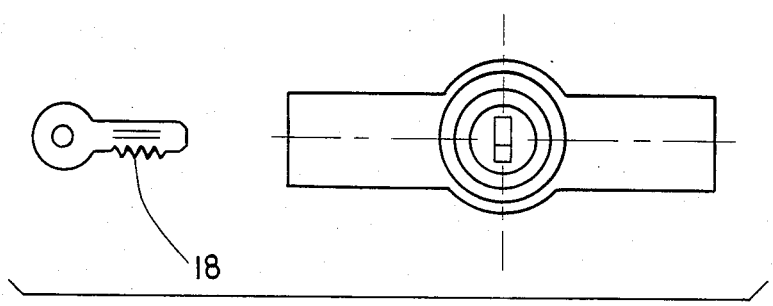
Figure 7:
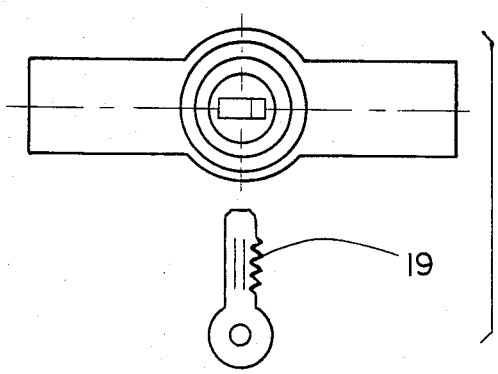
Figure 8:
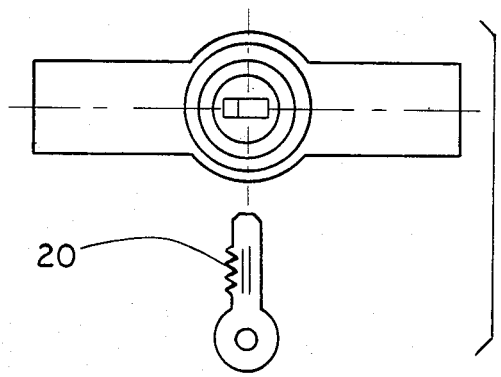

As is more clearly shown in FIG. 3, bar 44 has a broadened midsection 50 that mates with the opening 43 which in turn provides a guide slot for insuring that both of the cams 24 are uniformly extended and retracted as the bar 44 is driven by screw 48.

Upon rotating cylinder 34 and nut 28 in the counterclockwise direction, it will be apparent that screw 48 will be driven outwardly to in turn drive rod 44 outwardly and by means of the coupling 46, cause cams 24 to rotate about pins 42 with their distal extremities expanding outwardly as indicated by the dashed lines 24.

Since the amount of rotation required of cams 24 in order to engage the internal walls of the cassette receiving opening of the tape player will vary from model to model, it is apparent that the amount of rotation of lock cylinder 34 will vary. Accordingly, the lock cylinder is designed so as to allow the key 16 to be removed at 90 degree intervals as illustrated in FIGS. 5–8.

Although the present invention has been described above with regard to a single preferred embodiment it will be apparent that alterations and modifications thereof could be made to achieve alternative results. It is therefore the intent of this application to cover all such alterations and modifications which fall within the true spirit and scope of the invention.

What is claimed is:

1. A locking device for preventing use of a cassette player or the like and thereby discouraging theft thereof, comprising:

body means having an exterior portion of dimensions large enough to prevent such portion from entering the cassette receiving opening of a cassette player, and an interior portion having dimensions suitable to allow same to enter the cassette receiving opening;

cam means disposed within said interior portion and adapted to expand outwardly to engage an interior wall of said cassette opening;

lock means disposed within said exterior portion; and actuating means coupling said lock means to said cam means for driving said cam means from a retracted position to an extended position, said actuating means including a screw and nut drive means coupled to a rotatable part of said lock means and adapted to move said cam means between said retracted position and said extended position as said lock means is changed from an unlocked configuration to a locked configuration, said screw being affixed to a bar means disposed in a slot formed in said interior portion and extending transversely relative to the axis of said screw with the distal ends of said bar means being pivotally attached to said cam means and wherein the nut of said nut drive means is affixed to the rotatable cylinder of a key lock forming said lock means.

2. A locking device for preventing use of a cassette player as recited in claim 1 wherein said bar means include guide means for mating with a guide-way formed in said interior portion and for insuring linear motion of said bar.

3. A locking device for preventing use of a cassette player as recited in claim 2 wherein said cam means are of generally triangular configuration and are disposed within said slot.

* * * * *